Dec. 11, 1951 E. SANTONI 2,578,604

SHUTTER DEVICE OF THE LAMELLAR TYPE FOR CAMERAS, AERIAL CAMERAS, SURVEY CAMERAS, AND THE LIKE

Filed May 14, 1947 4 Sheets-Sheet 1

INVENTOR
ERMENEGILDO SANTONI
BY Otto Munk
HIS ATT'Y

INVENTOR
ERMENEGILDO SANTONI
BY Otto Munk
HIS ATTY

INVENTOR:
ERMENEGILDO SANTONI
BY
Richardson, David and Nordon
ATTORNEYS

Dec. 11, 1951 E. SANTONI 2,578,604

SHUTTER DEVICE OF THE LAMELLAR TYPE FOR CAMERAS, AERIAL CAMERAS, SURVEY CAMERAS, AND THE LIKE

Filed May 14, 1947 4 Sheets-Sheet 4

INVENTOR:
ERMENEGILDO SANTONI
BY
Richardson, David and Nordon
ATTORNEYS

Patented Dec. 11, 1951

2,578,604

UNITED STATES PATENT OFFICE 2,578,604

SHUTTER DEVICE OF THE LAMELLAR TYPE FOR CAMERAS, AERIAL CAMERAS, SURVEY CAMERAS, AND THE LIKE

Ermenegildo Santoni, Florence, Italy, assignor to Societa per Azioni Officine Galileo, Florence, Italy, a corporation of Italy Application May 14, 1947, Serial No. 748,094
In Italy June 10, 1946

1 Claim. (Cl. 95—63)

As is known all the improvements heretofore applied to the "shutter" devices of cameras in general tend chiefly to equip this particular device with an increase in speed united to a greater photometric efficiency with at the same time an ever increasing simplicity both in construction and running: the whole being obtained with a minimum of bulk and weight.

This evolution is however opposed in some cases by the difficulty of agreement between technical photographic requirements and the working and constructional characteristics of the mechanical assembly making up the said shutter.

The question is particularly pertinent in the case of a shutter of the type working in the immediate vicinity of the diaphragm; in the contrivances devised up to the present time, none of which presents any such substantial difference from others, a slightly increased efficiency in the phase of opening is arrived at in some cases at the price of considerable complications, the solution of which is not always mechanically orthodox. The problem, as is known, presents solutions that are far from easy, particularly when the shutter itself must be applied to a lens with a high linear aperture, and this is naturally not taking into account the difficulties caused by the bulk of the said shutter, which bulk is almost always kept down to a minimum for practical reasons.

In fact, to maintain a high degree of efficiency from the shutter even when the periods of exposure are extremely brief, one is led either to give up the maximum exposure of the lens or keep it, at the price of an increase in power in the driving mechanism working the said shutter: hence it follows that increased strain is put on the mechanical parts which, already stressed by even not particularly short exposure periods, are thus subjected to a very severe strain.

The solution proposed in the shutter device that is the object of the present invention presents the following characteristics when compared with shutters of the usual known types:

1. A greater simplicity in embodiment of the kinetic assembly, by means of which the displacement of the closing parts of the shutter proper (lamellar shutter) is achieved;

2. A more rational arrangement of the driving mechanism (springs, for example, and the like);

3. A better utilization of the power produced by the said driving mechanism;

4. And lastly, less strain on the single parts that go to make up the mechanical assembly of the said shutter, when very brief periods of exposure are concerned.

The first of these characteristics has been achieved by the blades (lamellas) being hinged on two members (rings) endowed with relative and absolute motion in relation to the support, the whole being so arranged that the passage between the "open" and "closed" positions of the said blades shall be brought about without any inversion of movement; the second by the symmetrical arrangement assigned, on the said parts in movement, to the points on which the driving mechanism (springs or other suitable means) acts; the third by the fact that the whole ring-blade assembly is already in movement at the moment of the opening of the shutter device; the fourth by the fact that a special law of motion has been assigned to a member of the said assembly when in movement; high speed may in fact be attained progressively by the mechanical members of the whole without an exceptional degree of strain being imposed thereby on the said members. The device described hereinafter and illustrated in the accompanying drawings will give greater clarity to the ideas set forth above; this device is given however, solely by way of example, since the said ideas may take other forms of embodiment.

In the said drawings, Figures 1, 2, 3, 4 and 5 show schematically a shutter device in its various phases of operation, and more precisely:

Fig. 1 shows a shutter in working position;

Fig. 2 the same shutter with the mechanism in movement and the blades (laminas) at the beginning of the period of exposure; while Fig. 3 shows the said blades opened to their fullest extent; while Fig. 4 shows the said blades as they begin to close;

Figures 1, 2, 3:
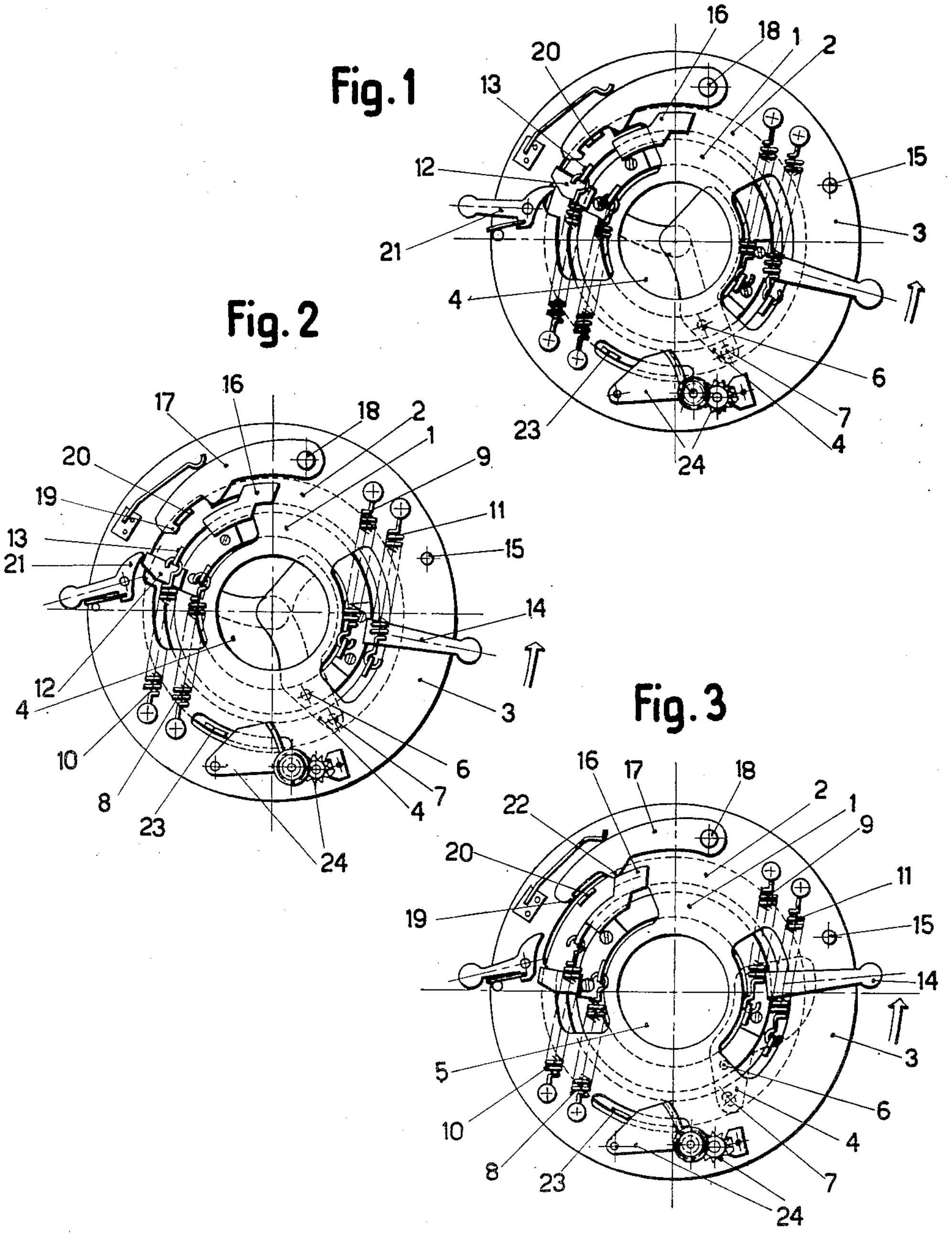

The device according to the invention (see Figs. 1–5) consists essentially of two concentric rings 1 and 2 so arranged in guiding slots for this purpose that they may be subjected to simultaneous or independent rotation in relation to the support 3.

The blades 4 controlling the opening 5 that allows light to enter the camera (the shutter proper) are worked, through a relative motion of the two rings, by the pins 6 round which each single blade rotates, and by the spindles 7, the said pins and spindles being in one with the rings 1 and 2 respectively.

These rings are connected to the fixed support 3 through the springs 8, 9 and 10—11; the whole being so arranged that when at rest (shutter run down, see Fig. 5) the two teeth 12 and 13 with which the two rings 1 and 2 are respectively provided, can come in contact with each other, while the lever 14 which is in one with the ring 1 is brought to a stop against the spindle 15 in one with the fixed part of the system.

Figures 4, 5, 6, 7:
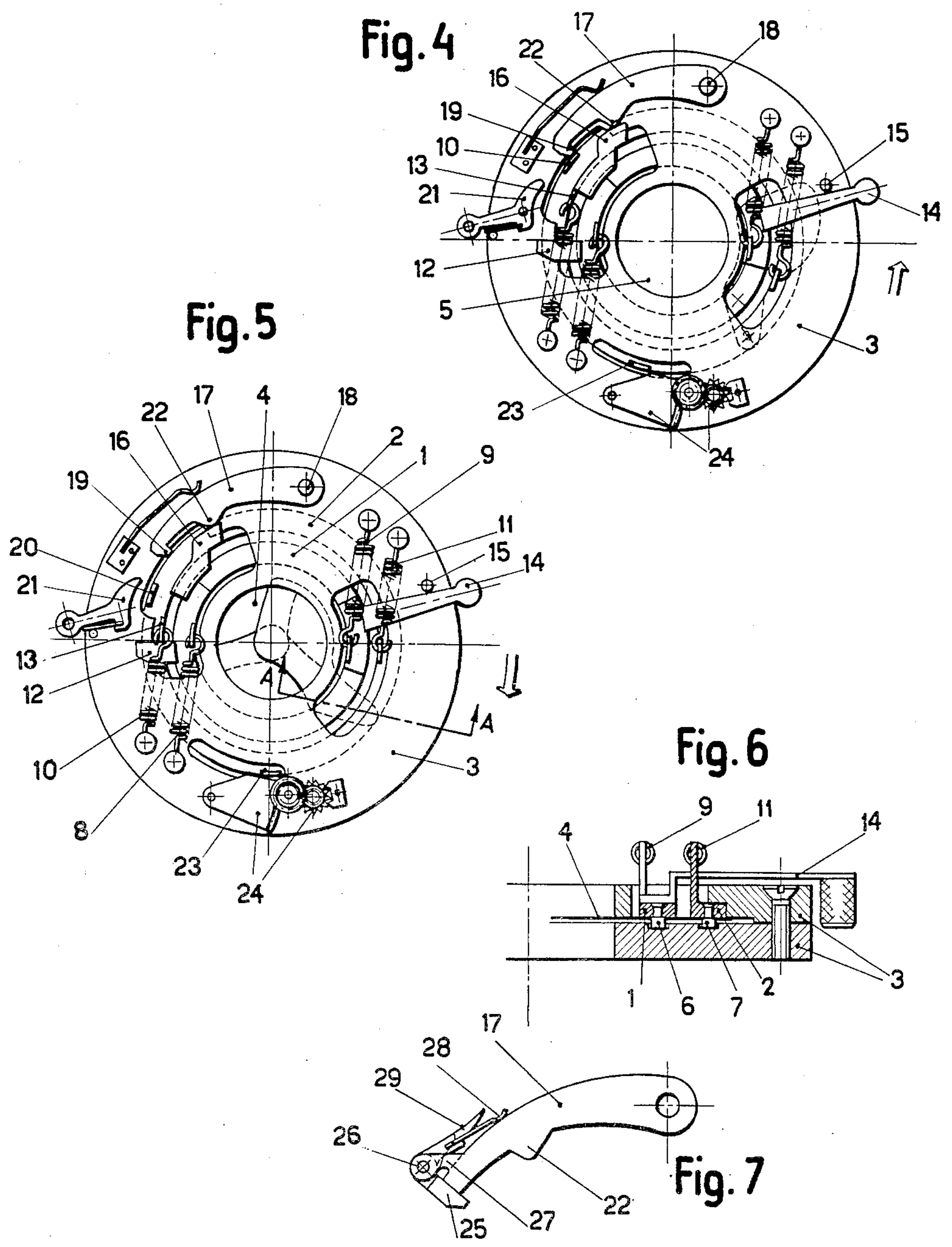
Fig. 5 shows the shutter device when shut.
Fig. 6 shows a section, on a suitably enlarged scale, along the line A—A of Fig. 5.
Fig. 7 shows in detail, and as an additional variation, a reducing member fit to come into action as soon as the laminas begin to open.

The ring 1 may be directly controlled from the outside by means for example, of the said lever 14 during the movement carried out on leaving the "closed shutter" position shown in Fig. 5, in the direction, winding up the springs 8, 9, 10 and 11 (see the direction of the arrow): the tooth 12 in one with the ring 1 is so formed as to drag the ring 2 with the tooth 13 into the same movement.

Continuing the charging phase, the lug 16 leaves the lever 17 hinged in 18 which was previously kept raised; the said lever 17 will consequently fall, while the tooth 19 carried on the said lever avoids the stop 20 in one with the outer ring 2.

Lastly the tooth 12 surpasses the release 21; at this point the tension on the four springs 8 to 11 is brought to a maximum while the shutter is tensioned (see particularly Fig. 1). Now by provoking the passage of the release 21 under the tooth 12 (see particularly Fig. 2 and following figures), the two rings 1 and 2 driven by the springs 8 and 9, and 10 and 11 respectively, will both at the same time begin to rotate in the direction shown by the arrow, in the opposite direction to the preceding charge, and will naturally be followed in their movement by the lamellas 14 assembly which, however, continues to remain closed.

At a certain point the stop 20 strikes against the tooth 19 of the lever 17 which is still lowered; the ring 2 is then arrested, while the ring 1 continues its course and the teeth 12 and 13 lose their contact: the laminas 4 being then held by the spindles 7 which are temporarily at rest, will rotate round the pins 6 which are displaced, while the opening 5 is uncovered (see particularly Fig. 3). Meanwhile the tooth 16 causes the ring 1 to continue its rotation, this tooth being in one with the said ring, and strikes against the projection 22 of the lever 17, raising it until the tooth 19 surpasses the projection 20 thus freeing the ring 2: the shape of the projection 22 of the lever 17 being such that the liberation of the tooth 20 is brought about when the laminas 4 are completely open.

The ring 2 is set in motion again through the agency of its springs 10 and 11 and the shutter therefore remains open until the inner ring is brought to rest by the lever 14 as it strikes against the fixed stop 15: from this moment the outer ring 2 as it continues its course, will bring the phase of the overlapping of the blades (closing) which overlapping will reach its maximum when the tooth 13 strikes against the tooth 12.

In the schematic working described above it has been assumed for the sake of simplicity, that the outer ring 2 comes into action immediately, as soon as it is disengaged, with the same angular speed as the inner ring 1: this however does not actually occur owing to the inertia proper to the system that has been freed. In order therefore to avoid a deleterious phase difference, the projection 22 and the tooth 16 are so shaped that 20 is released from 19 and consequently the ring 2 is freed, slightly in advance of the phase of maximum opening; the said maximum-opening position (see particularly Fig. 4) is then determined by the contact between 13 and 16 which acts as a relative stop between the two rings. By this contact and the contact 12—13 the extreme respective positions of the two rings are established with precision.

A suitable retarding device 24 which is very summarily indicated in Figs. 1–5 since it is a usual type, may in this phase be inserted through the tooth 23 in one with 2.

It is known that when one wishes to obtain a high speed in the process of opening and closing the shutter diaphragm, the group of laminas 3 together with their hinges is subjected to considerable strain; which, at a certain point results in the impossibility of compromise between the dimensions required for adequate resistance in each part and that needed for the masses in movement. To solve this problem the above mentioned compromise must rather be gained indirectly, that is to say by suitably controlling the increase in speed of the said masses. In the device according to the invention this has been made possible by the particular arrangement of the parts and by their kinetic embodiment.

According to the detail shown in Fig. 7 (which may be considered an additional variation of the tooth 19 of the lever 17) in the movement of the outer ring 2, subsequent to the disengagement of 21—12, the stop 20 strikes against the edge of a tooth 25 the support of which is able to rotate round the pin 26, the latter being supported by a lug 27 cut in the lever 17. The said support bearing the tooth 25 is connected to the lever 17 by means of a spring 28 which, as it is wound, gradually comes to lie on a suitably shaped lug 29 belonging to the support of the aforesaid tooth 25.

Consequently the speed of the ring 2 is not suddenly cut short (and the difference between the speed of the two rings is therefore brought to a maximum) but, according to a law established mainly by the ratios set up between the mass of the said ring, the reaction of the driving system applied thereto, the consistence of the spring 28 and the outline of the latter's support 29 created on the support of the said tooth 25; this arrangement being such that the resistance opposed by the spring shall not be linear.

The whole is therefore so arranged that in the time between the first contact between 26 and 25 and that of the stop with which the said tooth is provided against the lever 17, the movement described by the laminas 4 shall be such as to eliminate the reciprocal covering of the center of the shutter, the effective opening of the said shutter beginning at the end of the course of the tooth 25, when, therefore, the displacement is already in progress. By a similar artifice, since the shutter laminas can attain the high speed required gradually and following a well determined law, the driving device of the system can also be given a full charge.

On the other hand an overcharge is particularly favoured by the distribution of the points at which the springs 8, 9, 10 and 11 are applied, which springs represent the driving mechanism of the system. As may be clearly seen in the figures this symmetrical distribution, which determines a balance of strain, is only permitted by the particular shape of the contrivance that is the object of the present invention; as may easily be ascertained no resistance in fact is made to the movement of the rings except that caused by friction which is negligible when compared to the entity of the forces in play.

Further the attainment of a high speed on the part of the laminas 4 is favoured by the fact that at the beginning of the opening phase of the shutter, the laminas tend to move of their own accord by reason of the inertia inherent in their mass: which derives from the fact that their suitable arrangement, which is chosen in agreement with the rotary direction of the system, is influenced by the characteristic that at the beginning of the said phase the assembly of rings and laminas is already animated by a considerable speed.

The following detailed description of the operation of this invention is believed to be clear and explicit.

Figures 8, 9, 10, 11, 12, 13, 14:
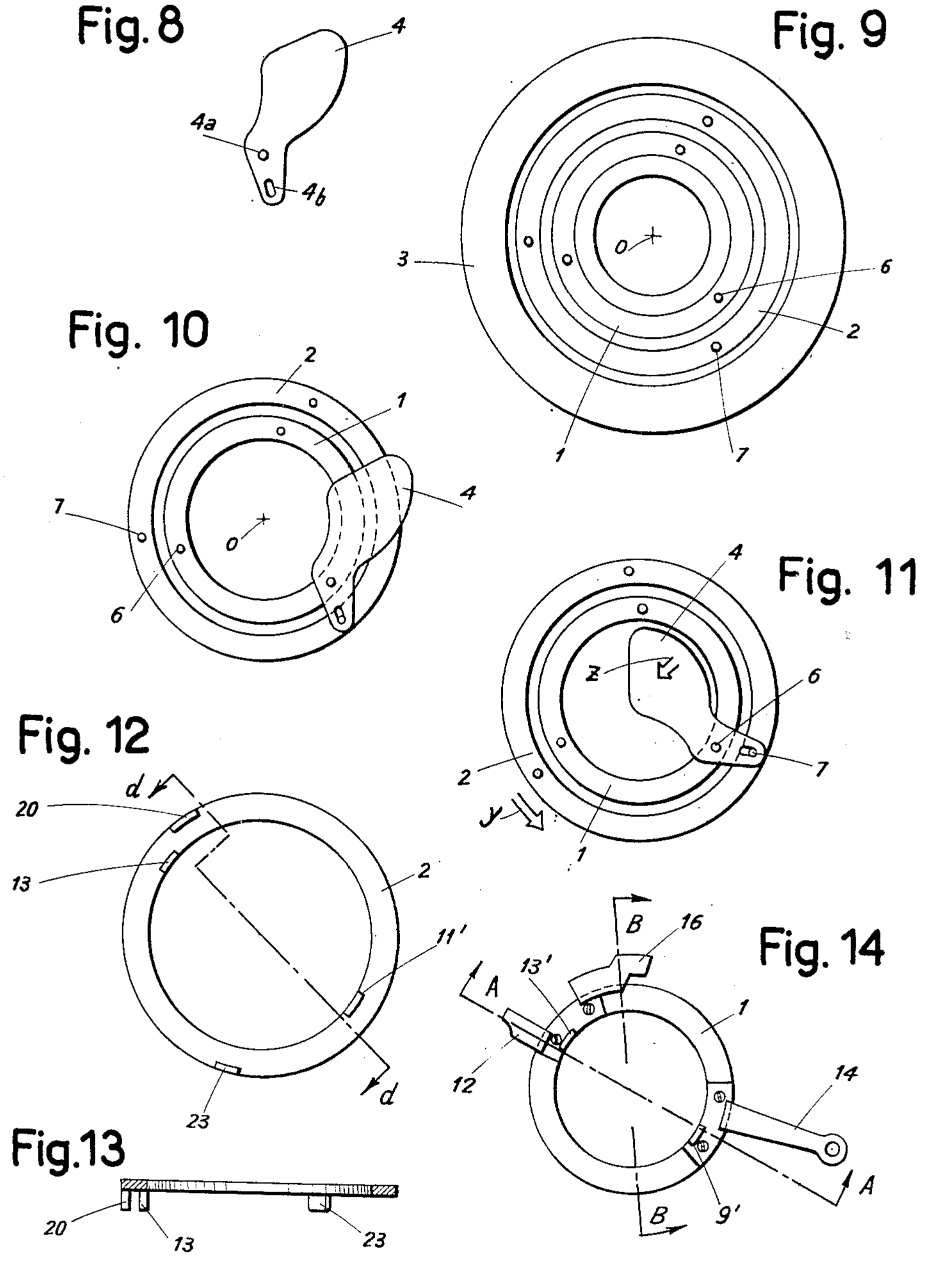
Fig. 8 is a plan view of a single blade.
Fig. 9 is a detail plan view, showing the ring arrangement.
Fig. 10 is a detail plan view, showing a single blade retracted.
Fig. 11 is a detail plan view, showing a single blade closed.
Fig. 12 is a plan view in detail of one of the rings.
Fig. 13 is a sectional view, on the lines *d—d* of Fig. 12.
Fig. 14 is a plan view, in detail, of the first ring.

With reference to the remaining figures of the drawings, the motion of the blades or laminas is determined in this way. Two rings 1—2, both lying in the plane A—A (plane of the drawing), can concentrically rotate in O, guided and supported in their respective grooves, provided in the support 3. A lamina or blade 4 (see Fig. 8) has a hole or recess *4a* and an elongated hole *4b* (a slotted groove). A pin 6 is integral with the ring 1 and the pin 7 is integral with the ring 2; the pin 6 goes into the hole *4a* of the lamina or blade 4 (see Fig. 10) and the pin 7 goes into the elongated hole *4b*.

The above described is arranged in such a way that if the ring 1 is kept tight and the ring 2 is given a displacement according to the arrow *y*, the blade 4, under the thrust of the pin 7 integral with the same ring 2, will be compelled to rotate in the direction of the arrow *z*. The complete action of the two rings 1—2, which occurs in the above mentioned way in each unit of the laminas or blades, symmetrically arranged around the center O, and mounted in the same way as 4, is thus the action which determines the interception and the introduction of the luminous energy upon the sensitive material located at the rear of the camera.

Figure 15:
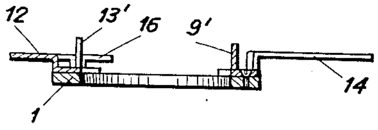
Fig. 15 is a sectional view, on the lines A—A of Fig. 14.
Figure 16:
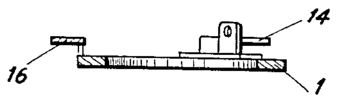
Fig. 16 is a sectional view, on the lines B—B of Fig. 14.
Figure 18:
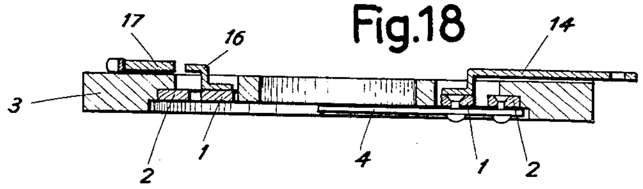
Fig. 18 is a sectional view, on the lines F—F of Fig. 17.
Figures 17, 19:
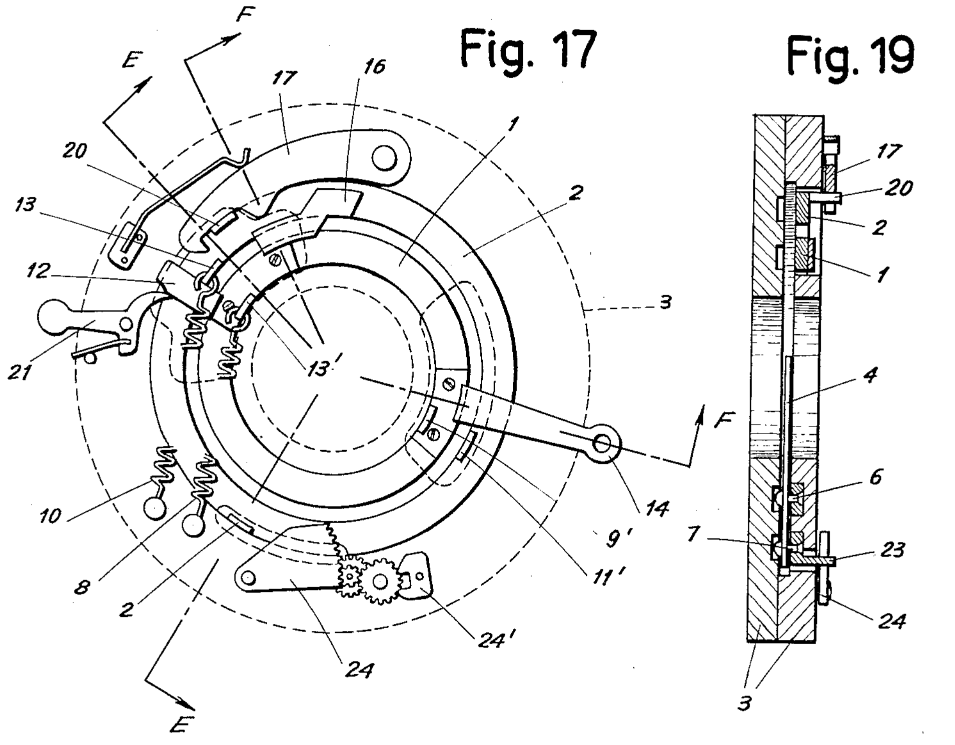
Fig. 17 is a plan view of a complete shutter, but omitting certain portions, more clearly to show other portions.
Fig. 19 is a sectional view, on the lines E—E of Fig. 17.

On the plane opposite that one on which the pin 6 and the spindle 7 are located, the ring 1 bears integral therewith the tooth 12 (see section A—A, Fig. 15) which, of course, shows only the ring 1, a notch 13', a notch 9', the tooth 16 and finally the lever 14; the ring 2 (Fig. 12) has, integral therewith, the notch 13 and the teeth 26 and 23. For the movement of these elements integrally with said two rings, the support 3 is provided with suitable openings on the bottom. In Figs. 1 to 5 the shutter device is seen from the side of the support's bottom, from which the described projections and teeth arise. In these figures, the parts of the rings 1 and 2, which are not seen through the openings (that is, which remain hidden by the continuity of the support's bottom) are indicated by dotted lines. In Fig. 17, which shows the displacement of the rings, the contour of the openings, as well as the outline of the support 3, are dotted. The rings 1 and 2 are connected to the support 3, respectively, by the springs 8 and 10, which have one end secured to the support 3; the first of which 8, is connected with the other end of the ring 1 by means of the notch 13' and the second is connected to the ring 2 by means of the notch 13. Another pair of springs 9 and 11, having one end secured to the same support 3, are hooked respectively in 9' and 11'. This arrangement of the springs leads to the result that the rotation of the two rings occurs in only one direction.

As far as the tooth 23 is concerned, this element, as already said, is integral with the ring 2 and is arranged, during the motion, to drive a retarding device, acting on the slope of the sector 24, the teeth of which mesh with a gear, followed by other gears, the last of which drives an anchor 24' having a suitable factor of inertia. Any suitable type of a mechanical retarding device may be applied to the shutter, as well known in the art, the only condition being that the retarding device be driven by the tooth 23. As all mechanical types of retarding devices, it can be adjusted, changing the position of the sector 24 and thus the displacement which must be operated by the tooth 23, before getting away from the sector.

Having now particularly described and ascertained the nature of my said invention and in what manner the same is to be performed, I declare that what I claim is:

A shutter for use adjacent the diaphragm of a camera, including a substantially flat stationary support, provided with two concentric grooves having different diameters; a plurality of blades for said shutter; two concentric rings located and guided in said grooves; a first plurality of pins integral with one of said rings and penetrating into recesses formed in each of the blades; a second plurality of pins integral with the other of said rings and penetrating into grooves formed in each of the blades; a first plurality of springs anchored at one end to said stationary support and fastened at the other end to one of said rings; a second plurality of springs anchored at one end to said stationary support and fastened at the other end to the other of said rings; said two pluralities of springs being so disposed as to cause the rotation, in the same direction, of said two rings; a radial pawl integral with the inner ring and extending outwardly; a stop hinged on said stationary support and coacting with said radial pawl in order to lock the inner ring in the position wherein the shutter is under pressure against the tension of the respective springs; means for releasing said stop for actuation of the release; a first tooth integral with the outer ring and held in contact by the action of the respective springs, against the radial pawl of the inner ring; a lever provided with a hump and hinged on said stationary support and provided with a stopping tooth, a stop secured to the outer ring so as to retain said ring against the action of the respective springs after the starting of the movement of said two rings and coacting with said stopping tooth; a second shaped tooth integral with the inner ring, said tooth being so disposed as, with the continuation of the rotation of said inner ring, to enter in contact with said hump of said lever and so disposed as to lift said lever, in order again to release the outer ring; a second lever integral with the inner ring and so disposed as to cause the putting under tension of the shutter; and a further stop integral with said stationary support and coacting with said lever integral with the inner ring so as to determine the stopping, at the end of the travel, of said inner ring.

ERMENEGILDO SANTONI.

REFERENCES CITED

The following references are of record in the file of this patent:

UNITED STATES PATENTS

| Number | Name | Date |
|---|---|---|
| 2,344,382 | Aiken | Mar. 14, 1944 |
| 2,354,168 | Aiken | July 18, 1944 |
| 2,441,675 | Simmon et al. | May 18, 1948 |